United States Patent [19]

Bloss et al.

[11] Patent Number: 4,478,810

[45] Date of Patent: Oct. 23, 1984

[54] METHOD OF TREATING FINAL PRODUCTS FROM FLUE GAS DESULFURIZATION

[75] Inventors: Wolfgang Bloss, Gummersbach; Ulrich Mohn, Bergisch-Gladbach, both of Fed. Rep. of Germany

[73] Assignee: L. & C. Steinmüller GmbH, Gummersbach, Fed. Rep. of Germany

[21] Appl. No.: 413,484

[22] Filed: Aug. 31, 1982

[30] Foreign Application Priority Data

Sep. 5, 1981 [DE] Fed. Rep. of Germany ....... 3135200

[51] Int. Cl.$^3$ .......................... C01F 11/46; C01F 1/00; C01B 17/00
[52] U.S. Cl. ..................................... 423/555; 423/166; 423/242
[58] Field of Search .......... 423/242 A, 242 R, 244 A, 423/244 R, 166, 171, 172, 555; 106/109

[56] References Cited

U.S. PATENT DOCUMENTS 3,579,296  5/1971  Cann ................................... 423/242

FOREIGN PATENT DOCUMENTS 51-37095  3/1976  Japan ................................... 423/555
51-83095  7/1976  Japan ................................... 423/555

*Primary Examiner*—Gregory A. Heller
*Attorney, Agent, or Firm*—Becker & Becker, Inc.

[57] ABSTRACT

A method of treating final products from a flue gas desulfurization. The flue gas desulfurization is carried out by the absorption of sulfur oxide in a spray dryer with a suspension which contains lime, or in a reactor with a dry, fine-grained, absorbent which contains lime. Prior to desulfurization, the fly ash carried along by the flue gas which is to be desulfurized is separated entirely, partially, or not at all from the flue gas, and the final products from the flue gas desulfurization, prior to any further treatment thereof, amount to 1-99% by weight, preferably 1-70% by weight, of fly ash, and 1-99% by weight, preferably 30-99% by weight, of the sum of the desulfurization products, preferably calcium sulfite hemihydrate, and/or calcium sulfite, and/or calcium sulfate dyhydrate, and/or calcium sulfate hemihydrate, and/or calcium sulfate, as well as residue of the absorbent. The reduction of the amount of calcium sulfite is implemented by a dry oxidation with air.

2 Claims, 3 Drawing Figures

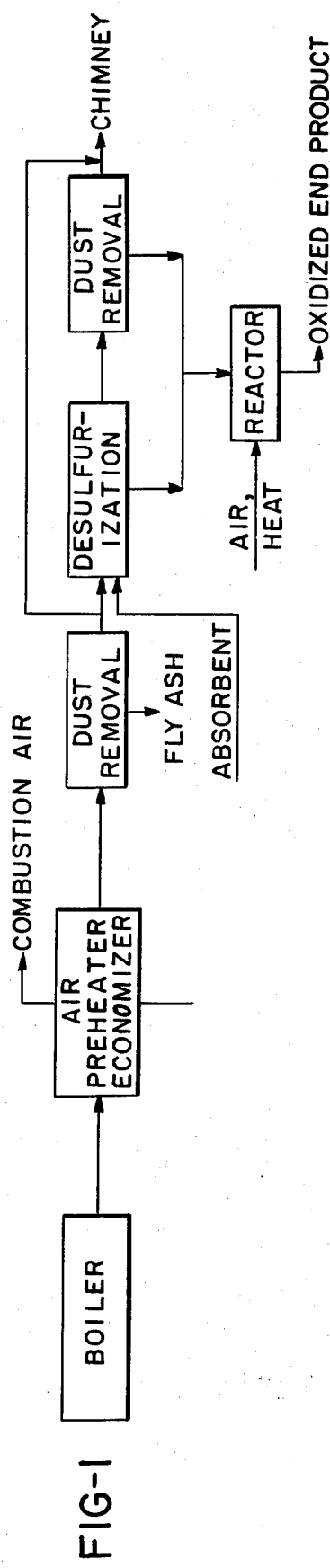
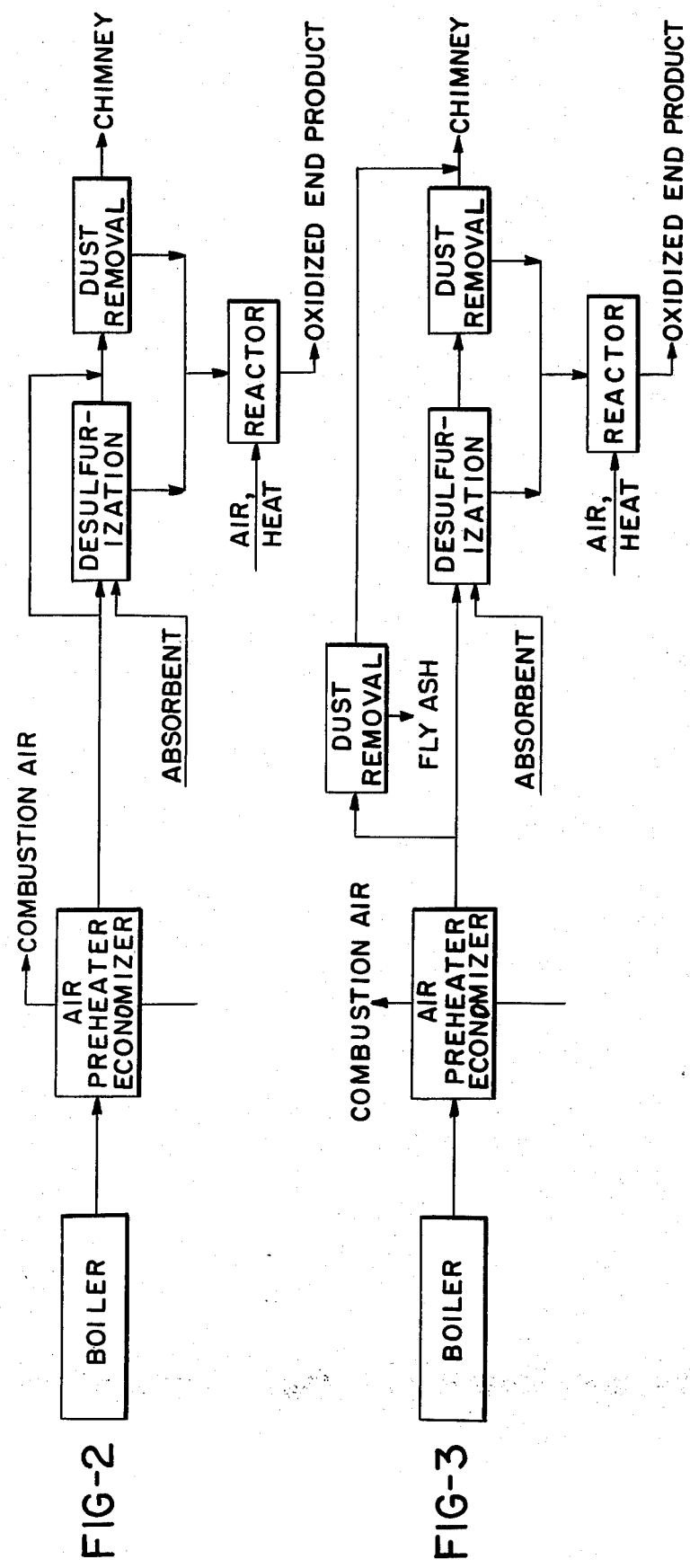

METHOD OF TREATING FINAL PRODUCTS FROM FLUE GAS DESULFURIZATION

The present invention relates to a method of treating end products from a flue gas desulfurization; the flue gas desulfurization is carried out by the absorption of sulfur oxide in a spray dryer with a suspension which contains lime, or in a reactor with a dry, fine-grained, absorbent which contains lime; prior to desulfurizaton, the fly ash, carried along by the flue gas which is to be desulfurized, is separated entirely, partially, or not at all from the flue gas, and the end finished, or final products from the flue gas desulfurization, prior to any further treatment thereof, comprise 1–99% by weight, preferably 1–70% by weight, of fly ash, and 1–99% by weight, preferably 30–99% by weight, of the sum of the desulfurization products, preferably calcium sulfite hemihydrate, and/or calcium sulfite, and/or calcium sulfate dyhydrate (gypsum), and/or calcium sulfate hemihydrate, and/or calcium sulfate, as well as residue of the absorbent.

When treating flue gases which result from the combustion of fossil fuels, steps have to be taken with respect to the tightened-up air pollution regulatons, which reduce the permissible sulfur content of such flue gases. The treatment of the flue gases, in a known manner, can be effected by separating the sulfur oxide in a spray dryer or reactor.

Dry final products are obtained with this method of flue gas desulfurization; such final products as a rule contain a mixture of fly ash, calcium-containing reaction products, and residue of the calcium-containing absorbent. The fly ash can be separated entirely or partially prior to the desulfurization process, and can be removed either separately or in common with the desulfurization final products.

The further utilization of such final products, which have a high sulfite content, in the construction industry is at present still very limited, so that the by far preponderant part thereof must be dumped or otherwise disposed of.

At the same time, the calcium contained in the final product presents a special problem in that the calcium sulfite removes oxygen from ground water in a known manner by oxidation to $CaSO_4 \cdot 2H_2O$ (gypsum), especially in moist air. Thus, the calcium sulfite can affect the quality of the ground water.

It is further known that anhydrous calcium sulfite $CaSO_3$ results by heating calcium sulfite hemihydrate between approximately 385° C. and 410° C.; however, at the same time, beyond 400° C. there occurs an oxidation to calcium sulfate $CaSO_4$ (anhydrous gypsum or anhydrite), which is an exothermic reaction.

The oxidation of calcium sulfite hemihydrate into gypsum with a "wet" flue gas desulfurization is also known and has been realized industrially on a large scale; in this case for example air is in troduced into the suspension; additionally, the pH must be reduced to a value suitable for the oxidation.

Although this method could be utilized with the present dry final product, the dry final product must be suspended in water, must then be brought to a suitable pH by adding sulfuric acid, and after the oxidation must again be dehydrated. This requires an extraordinarily high apparatus cost, and increased operating costs as a consequence of the sulfuric acid consumption.

Additionally, a portion of the latent hydraulic (or pozzuolanic) properties of the fly ash are lost due to the mixing with water, whereby, on the one hand, the usefulness in the construction industry is further restricted, and on the other hand characteristics relevant for dumping, such as water permeability and leaching or extraction characteristics, are worsened.

It is therefore an object of the present invention to reduce the amount of calcium sulfite in such a manner that the inventive method is more economical than the heretofore known procedural techniques.

This object, and other objects and advantages of the present invention, will appear more clearly from the following specification in connection with the accompanying drawing, in which:

FIG. 1 is a schematic block diagram showing one possibility for carrying out the method in accordance with the present invention;

FIG. 2 is another schematic block diagram representing another possibility for carrying out the method in accordance with the present invention; and FIG. 3 is a further schematic block diagram showing yet another possibility for carrying out the method in accordance with the present invention.

The method of the present inventon is characterized primarily in that the reduction of the amount of calcium sulfite is implemented by a dry oxidation with air. According to a further development of the present invention, the oxidation can be carried out at temperatures between 400° C. and 800° C., preferably 400° C. and 600° C. The energy requirement necessary for oxidation of the calcium sulfite portion, according to the present invention, can be met entirely or partially by supply of hot flue gases or by combustion air from the power plant process.

Referring now to the drawing in detail, the operating sequence of the inventive method can occur in a reactor, whereby apparatus can be installed and employed for drying, dehydration, or calcination, such apparatus being already known in certain industries, for instance the binder industry. The retention time of the material in the reactor depends upon the process temperature.

As illustrated in FIGS. 1, 2 and 3, in order to keep the energy costs as low as possible, it can be advantageous to separate off a portion of the fly ash prior to the desulfurization, thus reducing the quantity of material to be heated.

Very essential for the economic feasibility of the method is the fact that the oxidation of $CaSO_3$ to $CaSO_4$ is an exothermic reaction. A considerable part of the energy requirement is met by this heat of reaction, which is approximately 250 kJ/mol. Depending upon the amount of fly ash and the heat loss of the reactor utilized, some heat must still be added. This heat can be introduced by combustion of fuels, or, as mentioned above, by hot combustion air or flue gas from the power plant process, or a combination of these possibilities.

The advantages of the proposed method extend not only to the procedural technique of the calcium sulfite oxidation, but also extend to the properties of the final products resulting therefrom.

With this proposal, aside from a small apparatus cost, no additional means need be introduced, for instance for pH regulation.

Thus, in comparison to methods which operate with a suspension, low operating costs result. Additionally, a high availability is provided due to the simple construction and the likewise simple procedural principle of the oxidation. The proposed method operates free of waste water.

With a view to the characteristics of the end products relevant for dumping, the advantage exists primarily in the reduction of the calcium sulfite portion in favor of anhydrous gypsum or anhydrite, and hence in the reduction of the chemical oxygen requirement.

At the same time, the inventive method results in a strength carrier or binder being formed in the final product, since the anhydrite, as it occurs in the proposed manner, can spontaneously rehydrate into gypsum, and can therefoe set or harden, while calcium sulfite acts as an inert material in this respect.

Finally, as a result of the reduction of the calcium sulfite portion in the final product, the possible further use in the construction industry of such construction materials is made possible where an increased amount of calcium sulfite has a negative effect.

The present invention is, of course, in no way restricted. to the specific disclosure of the specification and drawing, but also encompasses any modifications within the scope of the appended claims.

What we claim is:

1. A method of treating products resulting from a flue gas desulfurization, said method of treating being effective externally of a combustion chamber and for producing an industrially usable calcium sulfate anhydrite construction material comprising in combination the steps of:
   at least partially separating out fly ash from the flue gas which is to be desulfurized;
   thereupon carrying out desulfurization of flue gas by absorption of sulfur oxide with a lime-containing absorbent to produce products which, prior to any further treatment thereof, contain at least some calcium sulfite therewith, and in particular contain 1–70% be weight fly ash, and 30–99% by weight of the sum of the desulfurization products and residue of said absorbent;
   said desulfurization products including at least one of the group consisting of calcium sulfite hemihydrate, calcium sulfite, calcium sulfate dyhydrate, calcium sulfate hemihydrate, and calcium sulfate;
   thereafter effecting a reduction of the amount of calcium sulfite by means of a dry oxidation with air of said products to obtain a difficult to dissolve calcium sulfate anhydrite employable for the construction industry;
   carrying out said oxidation only at temperatures in a range between 400° C. and 600° C.; and
   at least partially meeting the energy requirement necessary for said oxidation by supplying hot flue gases to the dry oxidation.

2. A method of treating products resulting from a flue gad desulfurization, said method of treating being effective externally of a combustion chamber and for producing an industrially usable calcium sulfate anhydrite construction material comprising in combination the steps of:
   at least partially separating out fly ash from the flue gas which is to be desulfurized;
   thereupon carrying out desulfurization of flue gas by absorption of sulfur oxide with a lime-containing absorbent to produce products which, prior to any further treatment thereof, contain at least some calcium sulfite therewith, and in particular contain 1–70% by weight fly ash, and 30–99% by weight of the sum of the desulfurization products and residue of said absorbent;
   said desulfurization products including at least one of the group consisting of calcium sulfite hemihydrate, calcium sulfite, calcium sulfate dyhydrate, calcium sulfate hemihydrate, and calcium sulfate;
   thereafter effecting a reduction of the amount of calcium sulfite by means of a dry oxidation with air of said products to obtain a difficult to dissolve calcium sulfate anhydrite employable for the construction industry;
   carrying out said oxidation only at temperatures in a range between 400° C. and 600° C.; and
   at least partially meeting the energy requirement necessary for said oxidation by supplying combustion air to the dry oxidation.

* * * * *